Sept. 2, 1924.  
B. AMENDOLA  
RAILWAY BRAKE  
Filed Oct. 25, 1922  
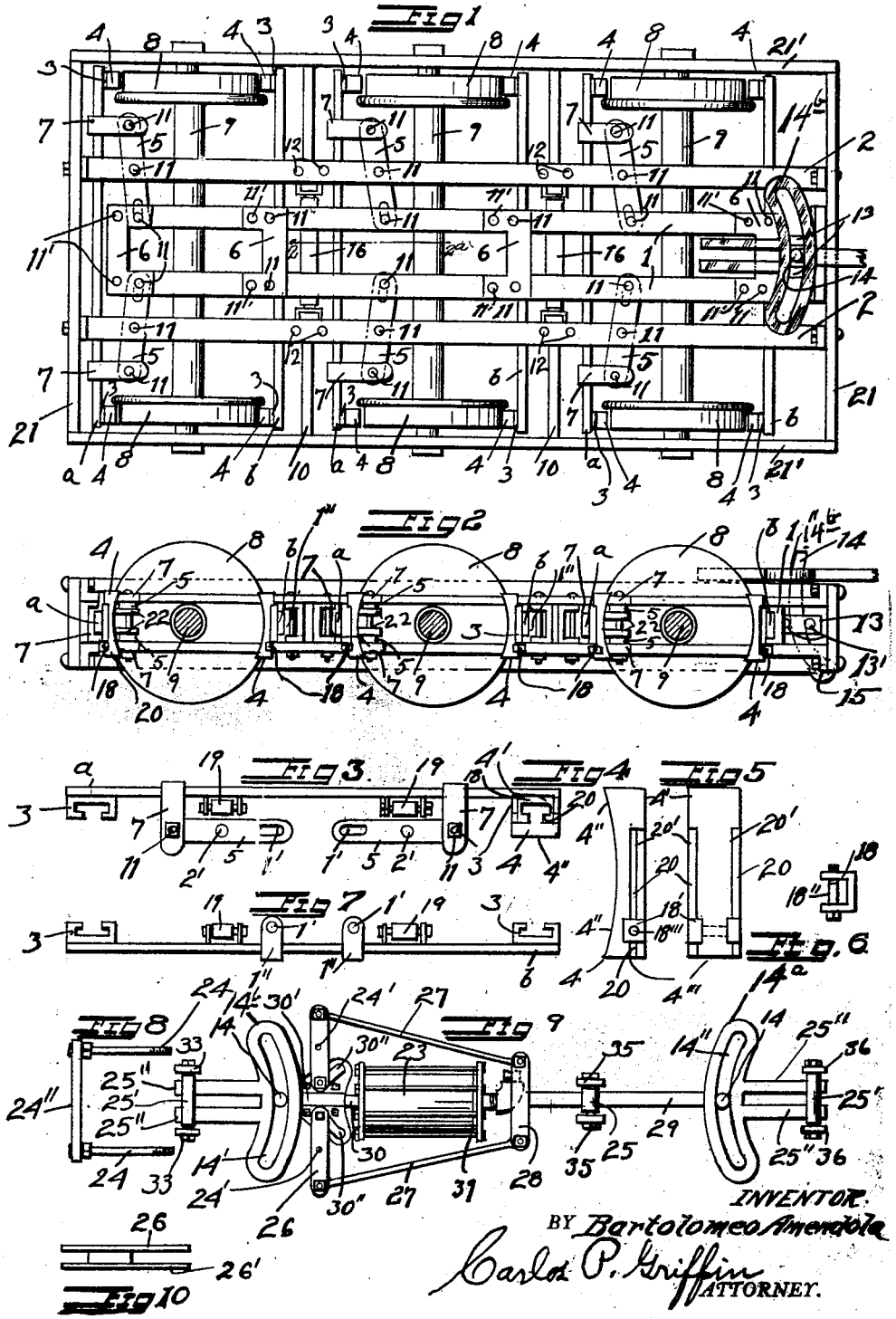
INVENTOR  
BY Bartolomeo Amendola  
Carlos P. Griffin  
ATTORNEY.

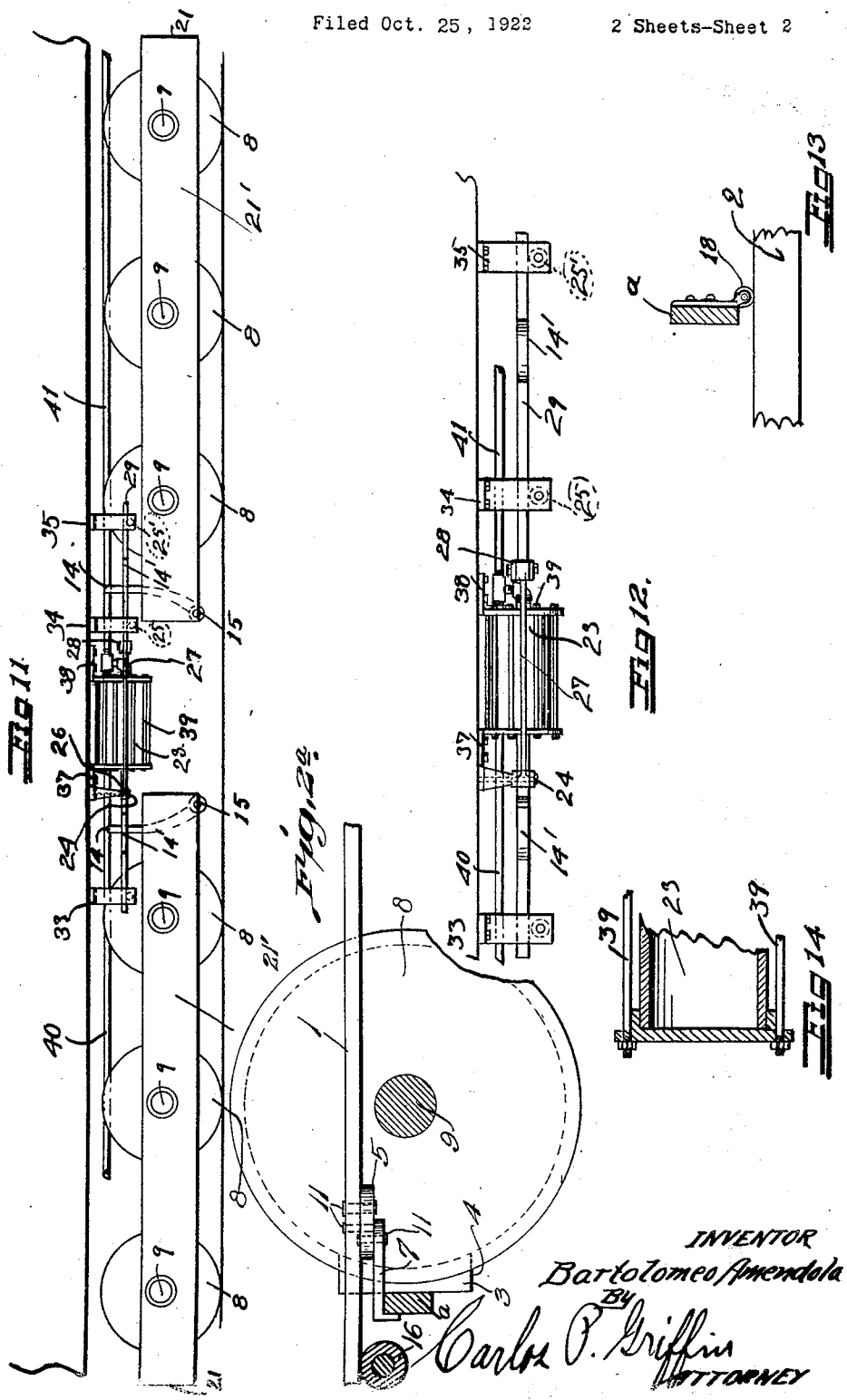

Patented Sept. 2, 1924.

1,507,102

UNITED STATES PATENT OFFICE.

BARTOLOMEO AMENDOLA, OF SAN FRANCISCO, CALIFORNIA.

RAILWAY BRAKE.

Application filed October 25, 1922. Serial No. 596,770.

*To all whom it may concern:*

Be it known that I, BARTOLOMEO AMENDOLA, a citizen of Italy, residing at San Francisco, in the county of San Francisco, State of California, have invented a new and useful Railway Brake, of which the following is a specification, in such full and clear terms as will enable those skilled in the art to construct and use the same.

This invention relates to a railway brake for cars of all kinds, and its object is to produce a brake which will be capable of being equally applied to all of the wheels of a given truck or car.

Another object of the invention is to provide means whereby the brake will be completely removed from the wheels when not applied, to prevent it from dragging when no braking effect should be applied.

Another object of the invention is to provide a brake which will cause a minimum thrust upon the car axles thereby preventing undue displacement of the trucks with respect to the car axles, and preventing the undue wear of the car axles and their journals.

Another object of the invention is to provide a simple and effective means for operating the brakes on two trucks from a single power cylinder.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of a truck having this brake applied thereto,

Fig. 2 is a side elevation of the truck shown in Fig. 1, with one of the truck sides removed for the purpose of illustration.

Fig. 2ᵃ is a sectional view on the line 2ᵃ—2ᵃ of Fig. 1,

Fig. 3 is a plan view of one of the brake shoe's carrying bars with one of the brake shoes removed therefrom.

Fig. 4 is a side elevation of one of the brake shoes,

Fig. 5 is a back view of one of the brake shoes

Fig. 6 is a view of one of the brake shoe's retaining shackle,

Fig. 7 is a plan view of one of the brake shoe's carrying arms and operating levers removed therefrom, Fig. 8 is a plan view of one form of connecting link for the operation of two sets of brakes, Fig. 9 is a plan view of the power cylinder and operating members for the operation of two sets of brake shoes, Fig. 10 is a longitudinal elevation of one pair of the links used to connect the driving head at one side of the brakes with the rods for the operation of the other set of brakes, Fig. 11 is a side elevation of a portion of a car with two trucks applied thereto, Fig. 12 is a side elevation of a portion of the car showing the application of the power cylinder thereto upon a slightly larger scale than Fig. 11, and Fig. 13 is a detail view showing the manner of supporting the brake shoe carrying arm, Fig. 14 is a sectional view of a portion of the air brake cylinder showing the manner of connecting the cylinder to one of the end casings.

In the present case the car truck consists of four longitudinally extending frame members 2, two with upturned ends and two with depending ends connected to the end frame members 21. These latter members are in turn connected together by the two side members 21', which side members carry suitable journal boxes which receive the ends of the journals 9 carried by the car wheel 8.

Two transverse bars 10 connect the side members 21' together between each pair of axles. These transverse bars 10 support two rollers 16 upon which the rectangular brake operating frame 1 is movable. This frame is connected together by means of two plates 6 at its middle portions and by two plates 6 at the ends, rivets 11' being used to connect the plates to the two members 1.

At the end of the brake operating frame it carries two projecting lugs 13, which lugs have two bolts 13' extending therethrough to embrace the lever 14, pivotally mounted on the plate 21 adjacent the center of its lower edge, as indicated at 15.

Pivotally mounted on the underside of the two upper bars 2 are six levers 5. Pivot pins 11 connect the levers 5 to the two members, and other pivot pins 11 connect the ends of said levers to the brake operating brackets 7 and to the slidable rectangular frame 1.

The inner end of each lever 5 is slotted to receive its corresponding pin 11, so as to permit the necessary lateral movement of said levers without binding upon the pivot pins 11.

The brake beams are six in number, those lettered "a" lying upon one side of the car wheels and those lettered "b" upon the other side of the car wheels.

Each brake beam carries two rollers 19, which rollers ride upon the lower supporting members 2, and each brake beam $a$ has two brackets 7 to connect each to the lever 5.

The brake beams $b$ are connected by means of two L-shaped plates 1″, which brackets are secured to the underside of the rectangular frame members 1—1.

Each brake beam carries two rollers 18 and 19, which rollers rest upon the lower frame member 2, with the result that when the brake beams $b$ are pushed in one direction to set the brake shoes connected with the brake beam $b$ that the other brake beams will be correspondingly moved in the opposite direction with their brake shoes 4 pulled against the car wheel.

The brake shoes consist of members 20 having one curved face and dove-tailed grooves on the opposite side thereof to connect them to the brake beams.

The brake blocks have a T-shaped flange formed on their back, as indicated at 20, which dove-tailed flange is adapted to be passed into similarly shaped brackets 3 on each brake rod.

A shackle 18 with the cap-screw 18″ is used in the recess 18′ to prevent the shoe being displaced from its carrier during the operation of the brake.

In order to operate brakes on two trucks at one time, the car frame is provided with four depending brackets 33, 24, 34 and 35, and the cylinder 23 is connected to the underside of the car frame by means of two brackets 37, 38 which also form the end castings of the cylinder. Bolts 39 connect the two end castings together and prevent leakage at the ends of the cylinder.

The casing 38 has the air pipe 39′ connected thereto, this air pipe having extensions 40, 41 to the ends of the car, as is common.

The piston rod 30 extends out one end of the cylinder and is connected to a piston in the usual manner, but has the head 30′ connected thereto, said head having a portion with a transverse horizontally extending curved slot 14′ and has two lugs 25′ extending therefrom between two rollers 25″ carried by the two depending brackets 33.

The head 30 also has two diverging slots 30″ which receive the pivot pins at one end of two levers 26. These levers are supported by the pins 24′ connected to the depending brackets 34 and at their outer ends they are connected to two rods 27 on opposite sides of the power cylinder (note the plan view Fig. 9).

At their opposite ends these rods 27 are connected to a cross bar 28 on the end of a bar 29 extending between two rollers 25 supported by the two depending brackets 35. At its opposite end the bar 29 is connected to a head 14ᵃ having a horizontally extending curved slot 14″ and said head terminates in two lugs 25″ extending between the two rollers 25′ carried by the two depending brackets 36. The slotted head 30 carries a head 14ᵇ which has a curved slot 14′ and two long lugs 25″, extending between rollers 25′ carried by the brackets 33, 33 the same as at the opposite end of the rod 29.

In order to equalize the strain, the two levers 26 are made up of two parts 26, 26′, as illustrated in Fig. 10, one part going above the head 30 and the other part below the same.

When a car is mounted, as illustrated in Fig. 11, upon two trucks, the trucks are so positioned that the levers 14 are on adjacent ends of the two trucks and said levers then extend through the slots 14′, 14″, and as the car moves around curves the heads in which said slots are formed allow the lever 14 to move laterally with respect thereto while still remaining in an operative position.

The brake shoes consist of the members 4′ with grooved faces 4″. The shoes have lateral grooves 20 with flanges 20′ to fit the brackets 3 on the brake beams. At its lower portion each shoe has recesses 18′ to receive the shackle 18 and a hole 18‴ to receive the pin 18″ to retain the shoes in place.

The two brackets 24 are connected at their lower ends through the openings 24′ to the levers 26 and said brackets hold said levers in such a position as to cause the two heads with the grooved slots for the operation of the levers 14 to move in opposite directions whenever the piston 30 is pushed out of the cylinder, whereby the brakes are applied to the wheels equally on both sides thereof.

It will be noted that as the rectangular frames 1 move to the left, Fig. 1, thereby pushing each pair of brakes attached thereto, toward its corresponding axle, that the other pair of brakes will be moved in the opposite direction against the wheels, equalizing the thrust upon the axle.

I claim:

1. In a railroad car brake the combination with a car truck and its wheels of a pair of brake beams on opposite sides of each set of wheels, a slidable frame connected to the brake beams on one side of the wheels, and levers connecting the brake beams on the other side of the wheels to said frame, whereby movement in one direction causes the brake beams on both sides of the wheels to bear thereon.

2. In a railroad car brake, the combination with a car truck and its wheels of a pair of brake beams on the opposite sides of each pair of wheels, a slidable frame on the car truck, means to support the brake beams on one side of each pair of wheels from said frame, levers pivoted on the car truck and connected to the brake beams on the opposite side of the wheels and to the slidable frame whereby the brake beams are caused to move toward the wheels when the slidable frame is moved in one direction, and means to flexibly connect the operating mechanism on the truck with the operating mechanism on the car body.

3. In a railroad car brake, the combination with a car truck and its wheels, of a pair of brake beams for each pair of wheels, a slidable frame, rollers to support said frame, means to connect said frame to the brake beams to move them in opposite directions simultaneously and means to flexibly connect said frame to operating means carried by the car body.

4. In a railroad brake, the combination with a car truck and its wheels of a pair of brake beams on opposite sides of each pair of wheels, a slidable frame on the truck, means to support the brake beams from the car truck with one on each side of each pair of wheels, links connecting the other brake beams to said frame whereby the brake beams move in opposite directions, rollers carrying each brake beam, and means to operate the brakes from a power cylinder on the car.

5. In an apparatus of the class described, the combination with a car truck and its wheels of a pair of brake beams for each pair of wheels, a slidable frame on the truck, means to rigidly connect one brake beam for each pair of wheels to said slidable frame, a pair of links for each other brake beam to connect it to said slidable frame, whereby when the frame is moved in one direction, each pair of brake beams will move toward their respective wheels and a pair of brake shoes carried by each brake beam to bear upon the peripheries of the wheels.

6. An apparatus of the class described, comprising the combination with a truck and its wheels of a pair of brake beams on the opposite side of each pair of wheels, a slidable frame on the car truck, means to support the brake beams from the car frame, means to rigidly connect one brake beam adjacent each pair of wheels with said frame, a pair of links connecting each other brake beam with said frame whereby when the frame is moved in one direction the brake beams will be moved toward or from the wheels in opposite directions when the frame is moved in one direction or the other and detachable brake shoes carried by each brake beam for engagement with the peripheries of the wheels.

In testimony whereof I have hereunto set my hand this 16" day of October A. D. 1922.

BARTOLOMEO AMENDOLA.